US008794874B2

(12) United States Patent
Roodenburg et al.

(10) Patent No.: US 8,794,874 B2
(45) Date of Patent: Aug. 5, 2014

(54) MARINE TENSIONER (75) Inventors: Joop Roodenburg, Delft (NL); Terence Willem August Vehmeijer, Den Haag (NL)

(73) Assignee: Itrec B.V., Schiedam (NL)

( * ) Notice: Subject to any disclaimer, the term of this patent is extended or adjusted under 35 U.S.C. 154(b) by 679 days.

(21) Appl. No.: 12/809,387

(22) PCT Filed: Jan. 12, 2009

(86) PCT No.: PCT/NL2009/000003
§ 371 (c)(1),
(2), (4) Date: Sep. 27, 2010

(87) PCT Pub. No.: WO2009/088287
PCT Pub. Date: Jul. 16, 2009

(65) Prior Publication Data
US 2011/0033243 A1  Feb. 10, 2011

(30) Foreign Application Priority Data
Jan. 11, 2008  (EP) ...................................... 08075030

(51) Int. Cl.
F16L 1/23 (2006.01)
F16L 1/19 (2006.01)
F16L 1/225 (2006.01)
F16L 1/26 (2006.01)

(52) U.S. Cl.
USPC ..................... 405/168.4; 405/168.3; 405/166; 405/169; 405/158

(58) Field of Classification Search
USPC ..................... 405/168.4, 168.3, 166, 169, 158
See application file for complete search history.

(56) References Cited

U.S. PATENT DOCUMENTS

| 3,680,342 | A | * | 8/1972 | Mott et al. ...................... 72/161 |
| 4,655,291 | A | * | 4/1987 | Cox .............................. 166/385 |
| 4,687,376 | A | * | 8/1987 | Recalde ..................... 405/168.3 |
| 4,789,108 | A | * | 12/1988 | Recalde ..................... 242/388.7 |
| 4,810,132 | A | * | 3/1989 | Diehl ............................. 405/166 |
| 4,820,082 | A | * | 4/1989 | Recalde ..................... 405/168.3 |
| 4,917,540 | A | * | 4/1990 | Recalde ..................... 405/168.3 |
| 4,984,934 | A | * | 1/1991 | Recalde ..................... 405/168.3 |
| 5,044,825 | A | * | 9/1991 | Kaldenbach ................. 405/166 |
| 5,527,134 | A | * | 6/1996 | Recalde ..................... 405/168.3 |
| 5,533,834 | A | * | 7/1996 | Recalde ..................... 405/168.3 |

(Continued)

FOREIGN PATENT DOCUMENTS

GB  2 286 647 A  8/1995

*Primary Examiner* — John Kreck
*Assistant Examiner* — Edwin Toledo-Duran
(74) *Attorney, Agent, or Firm* — Birch, Stewart, Kolasch & Birch, LLP (57) ABSTRACT A marine tensioner has a tensioner frame and multiple track units mounted in the frame. Each track unit comprises an elongated chassis, the chassis having a central portion between two end portions. Each track unit comprises an endless track supported by the chassis, the endless track having friction elements adapted to engage an elongated article. Between each track unit and the tensioner frame a connecting structure is provided that allows for lateral and pivotal motion of the track unit so as to adapt the position of the track unit to an elongated article diameter. One or more squeeze actuators are provided between the tensioner frame and the chassis of the track unit and actuator control means are provided which are associated with the one or more squeeze actuators and allow to control the squeeze force exerted by the friction elements of the track unit on the elongated article.

17 Claims, 12 Drawing Sheets

(56) References Cited

U.S. PATENT DOCUMENTS

| | | | |
|---|---|---|---|
| 5,573,353 A * | 11/1996 | Recalde | 405/168.3 |
| 5,692,859 A * | 12/1997 | Dickson et al. | 405/168.4 |
| 5,718,538 A * | 2/1998 | Recalde | 405/168.1 |
| 5,775,417 A * | 7/1998 | Council | 166/77.3 |
| 5,823,712 A * | 10/1998 | Kalkman et al. | 405/165 |
| 6,257,794 B1 * | 7/2001 | Gobled et al. | 403/28 |
| 6,394,445 B1 * | 5/2002 | d'Agrella et al. | 271/182 |
| 6,439,445 B1 * | 8/2002 | De Groot et al. | 226/172 |
| 6,450,385 B1 * | 9/2002 | Guerin | 226/89 |
| 6,524,030 B1 * | 2/2003 | Giovannini et al. | 405/166 |
| 6,761,505 B2 * | 7/2004 | Stockstill | 405/166 |
| 7,189,028 B1 * | 3/2007 | Signaroldi et al. | 405/166 |
| 7,226,244 B1 * | 6/2007 | De Groot et al. | 405/168.4 |
| 8,104,995 B2 * | 1/2012 | Roodenburg et al. | 405/168.4 |

\* cited by examiner

MARINE TENSIONER

FIELD OF THE INVENTION

The present invention relates to a tensioner for handling an elongated article, such as a pipeline in marine pipeline installation wherein a pipeline for transportation of hydrocarbons (oil, gas, etc) is laid on the seabed. The tensioner may also be embodied and/or used for handling other elongated articles, such as hydrocarbon risers, as well as e.g. an umbilical (e.g. for subsea equipment, ROV, geosurveying tooling, etc).

BACKGROUND OF THE INVENTION

Tensioners are well known in the field of marine pipelaying, often having the task of supporting the weight of the launched pipeline. Tensioners are used for many pipelaying techniques, such as S-lay, Reel lay, J-lay. Tensioner having a large "load holding capacity" and in the field capacities of tens of tonnes, or even well over 100 tonnes, for a tensioner are not uncommon. An example of a tensioner is disclosed in U.S. Pat. No. 6,394,445 (Itrec).

In a known embodiment a marine pipeline installation tensioner comprises a tensioner frame and multiple track units mounted in said frame. The number of track units is normally adapted to the capacity and/or pipeline type and common tensioner designs include two, three or four track units (or possibly a variable number of track units). Each track unit includes a chassis and an endless track, with support rollers or other bearing means being mounted on the chassis for supporting the endless track, and one more track drive/brake members for effecting drive and/or braking motion of the track. The track is adapted to engage on the exterior of the pipeline, commonly as the track has friction elements, usually friction pads, engaging on said pipeline exterior.

It is known to arrange each track unit mobile within the associated frame so that the "gap" or "pipeline passage" between the tracks can be adapted to different pipeline diameters and possible to allow for an "widely opened" position of the track units wherein a large item (e.g. an accessory fitted in or on the pipeline, such as a pipeline connector) can pass through the tensioner.

In U.S. Pat. No. 6,394,445 it is disclosed to provide hydraulic cylinders between the frame of the tensioner and each track unit to create the "squeeze pressure" between the track and the pipeline exterior needed to hold the pipeline and absorb the pipeline load on the basis of friction and also to allow for displacement of the track unit to adapt to the pipeline diameter. It will be understood that the "squeeze pressure" needed between the pipeline and the tracks is very significant as the resultant frictional force might need to be several tens of tonnes, or even well over one hundred tonnes. The desire for very large pipeline weight support capacity of the tensioner e.g. stems from the desire to develop oil and gas fields in deepwater, where water depth (and thus length of launched pipeline supported by the tensioner, or multiple tensioners in series) might be more than 500 meters, or even over 1000 meters.

The pipelines to be launched with a pipelaying vessel equipped with a marine pipelaying system including one or more tensioners can vary significantly, i.e. with respect to pipeline properties (rigid pipeline or flexible pipeline, coated or non-coated, reeled or non-reeled, etc). Therefore the need exists for tensioners to be able to handle a wide range of different pipelines (possibly fitted with accessories having a larger cross-section than the pipeline itself).

The prior art tensioners have proven to be limited in respect of their range of application.

For instance a problem is that a pipeline may include a section having a non-uniform diameter, e.g. a lightly tapered section or other "minor" variation of pipeline diameter. As common tensioners are build to keep the tracks exactly parallel to the pipeline passage axis, the presence of such a lightly tapered section or other "variance" in pipeline diameter may result in overloading of the pipeline by the tracks.

SUMMARY OF THE INVENTION

The present invention aims to propose an improved marine tensioner.

The invention achieves the above aim by providing a marine tensioner according to claim 1, wherein the connecting structures are each adapted to—in addition to the lateral motion—allow for a pivotal motion of each track unit so as to obtain a non-parallel orientation of the tracks of the track units with respect to the elongated article passage axis.

By allowing pivotal motion it is possible to arrange the tracks e.g. such that a tapered section of the pipeline can be supported and passed through the tensioner without overloading of the pipeline. Also this pivotal arrangement allows for accurate control of squeeze force, and thus of squeeze pressure on the pipeline.

Preferably the connecting structure of each track unit is solely connected to the central portion of the chassis. This allows to create a pivot axis at the height of the central portion of the chassis with the effect that as one end portion moves inward the other end portion moves outward with respect to the passage axis. In a practical arrangement said pivot axis is located substantially in the middle between the ends of the track, preferably also between the active part and the return part of the track.

In a highly preferred embodiment the connecting structure of each track unit consist of a central linkage bar assembly which is pivotally connected to the central portion of the chassis at a chassis end thereof and pivotally connected to the frame at a frame end thereof. Most preferred each central linkage bar assembly includes two linkage bars on opposite sides of the track unit chassis, which allows to effectively counteract any tendency of the chassis to rotate about its longitudinal axis. Said linkage bars may be connected via a transverse member when desired.

In a preferred embodiment the central linkage bar assembly is arranged so as to be oriented generally parallel to the elongated article axis during operation of the tensioner. This allows the central linkage bar assembly to be subjected to tensile stresses during operation of the tensioner.

In a possible embodiment the central linkage bar assembly is arranged so as to be inclined with respect to the passage axis during operation of the tensioner, the linkage bar—from its frame end to its chassis end—generally extending counter to the direction of the pipeline load. This cause a "self-clamping effect" of the tracks onto the pipeline or the like. It is noted that in practice the major part of the squeeze force will be provided by the squeeze actuators, e.g. about 10% of the squeeze force being provided via this central linkage bar assembly.

Preferably multiple squeeze actuators are provided between a track unit chassis and the frame at spaced locations along the length of the chassis.

In a highly preferred embodiment, a central squeeze actuator, or more preferably a pair of central squeeze actuators operating in parallel, is arranged so as to engage on the central portion of the chassis and at least two further squeeze actuators (or squeeze actuator pairs) are provided, each engaging on a respective end portion of the chassis.

By three (pairs of) squeeze actuators along the length of the chassis, the effective stiffness of the chassis is far greater than with merely two actuators acting on the chassis.

It is preferred that the squeeze actuators are arranged to engage directly on the chassis of the track unit and not via any intermediate linkage, preferably the track unit having a rear side opposite from the active side of the track and the squeeze actuators engaging on said rear side.

Preferably the squeeze actuators are arranged to be directed substantially in a plane normal to the elongated article axis during operation of the tensioner, preferably within a range of at most 20 degrees with respect said plane.

Preferably the actuator control means allow to independently control the force exerted by each of said squeeze actuators on the chassis.

Preferably the actuator control means are adapted to compensate for vessel motion and/or sea state induced load variation. This is in particularly preferred when the tensioner includes the self-clamping effect producing single central linkage bar assembly. It will be appreciated that sea state induced vessel motions are likely to cause a periodic variation of the pipeline load on the tensioner. In an embodiment of a tensioner wherein a linkage bar assembly supporting the chassis is arranged so as to cause a self-clamping effect, this pipeline load variation then also produces a variation in squeeze force which may be undesirable. For said reason the invention proposes to design the actuator control means such that this squeeze force variation is measured (directly or indirectly, e.g. by monitoring vessel motion) and the actuators are then controlled to counteract any undesirable variation. This requires the actuators and the actuator control means to have a response significantly faster then of the disturbance, for instance allowing actuation of the actuators at a frequency of at least 1 Hz, preferably of at least 20 Hz.

In practice a computer or similar will be included in the actuator control means, this computer then including a program or routine which—in combination with e.g. hydraulic valves in a hydraulic actuator control means, allows to operate the actuator system at a relatively high frequency, e.g. at least at 1 Hz.

Preferably at the point of engagement of each squeeze actuator on the chassis a load cell is provided for measuring the actual force exerted at said location, a force signal of this load cell being transmitted to the actuator control means to control the squeeze force.

Other squeeze actuator designs can for instance be screw spindle actuators which have already been employed for pipeline tensioners.

In a most preferred embodiment at least three actuators are provided between a track unit chassis and the frame at spaced locations along the length of the chassis. This allows to more or less independently control the actual squeeze pressure exerted by the tensioner track on the pipeline or the like for each portion of the chassis on which an actuator engages. When three actuators are used this allows e.g. to set the squeeze pressure in the central region of the chassis at a different level than at both end regions (which may also be set at different levels). Such control of the exerted squeeze pressure on the length of pipeline held between the tracks is highly advantages in view of the desired or required "holding capacity" on the one hand and the effects of the squeeze pressure on the pipeline (or its coating etc) on the other hand.

It is further preferred that said actuators are hydraulic cylinders and wherein said control means are hydraulic control means that allow to control the pressure within each cylinder independently.

Preferably the tensioner has an annular frame comprising multiple ring frame members spaced along the axis of the tensioner and interconnected by further, preferably axially extending, frame members.

Preferably the tensioner frame is designed so that the tensioner can be opened.

In a preferred embodiment the tensioner frame includes a base part, e.g. essentially U-shaped in cross-section, onto which one or more track units have been mounted, and two or more other frame parts, which are then interconnected to form the ring frame members, wherein the free ends of the frame parts are interconnectable/detachable via connecting members, e.g. pins which can be fitted through aligned openings in the free ends.

Other designs of the connecting structure between the chassis and the frame, such as a slide structure or telescopic structure arranged—e.g. at right angles—to the chassis and the pipeline trajectory are also possible. Preference is however given to the single central linkage bar assembly as disclosed herein.

Preferred embodiments of the tensioner will now be explained in detail referring to drawing.

The present invention further relates to a marine pipelaying vessel provided with such a tensioner as well as to a method of pipelaying wherein use is made of such a tensioner.

DETAILED DESCRIPTION OF THE INVENTION

Figure 1:
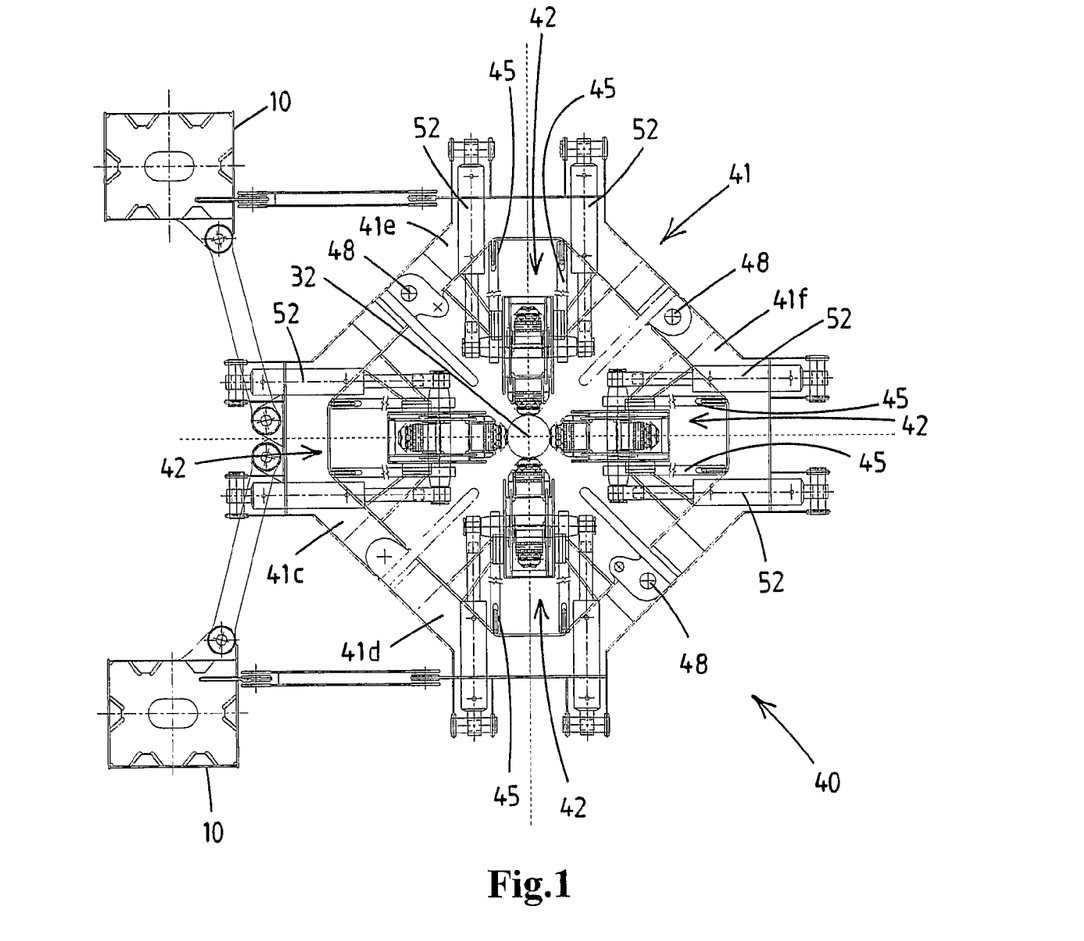
FIG. 1 shows in a top view a preferred embodiment of the marine tensioner according to the invention fitted on a support structure of a marine pipeline pipelaying vessel.
Figure 2:
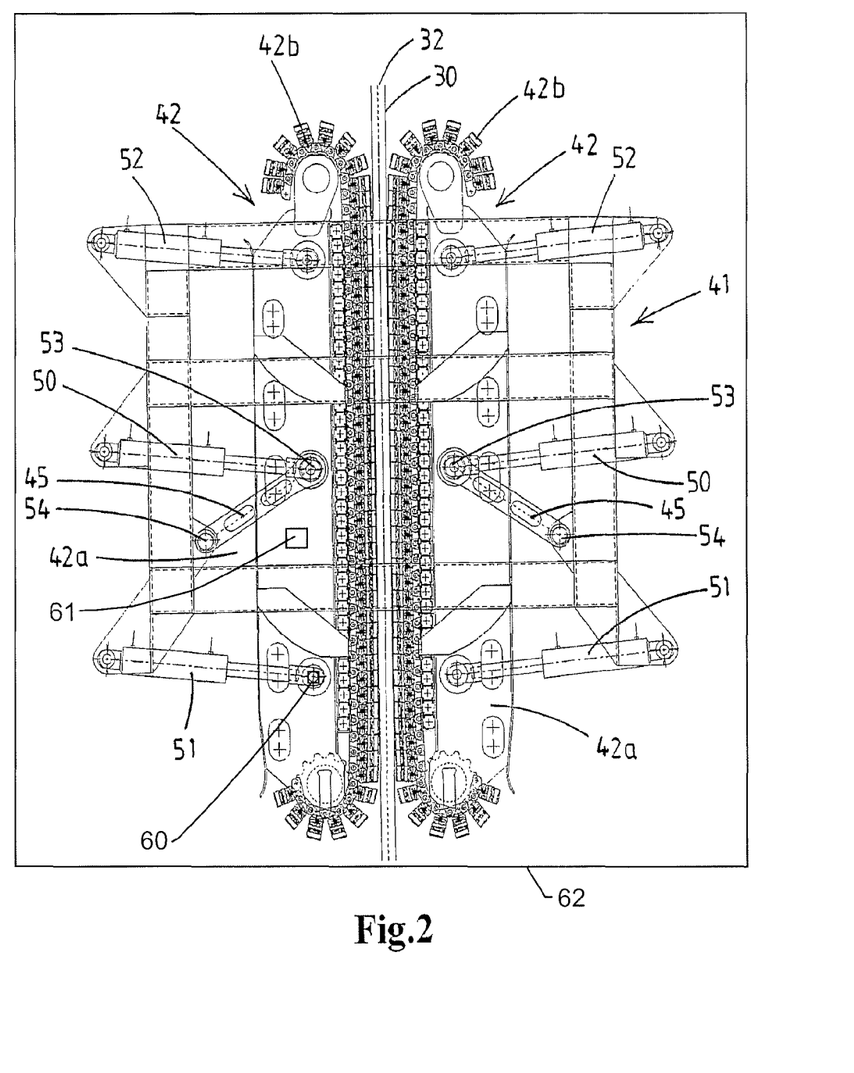
FIG. 2 shows in lateral side view two track units and the frame of the tensioner of FIG. 1 when handling a rather small diameter pipeline.
Figure 3:
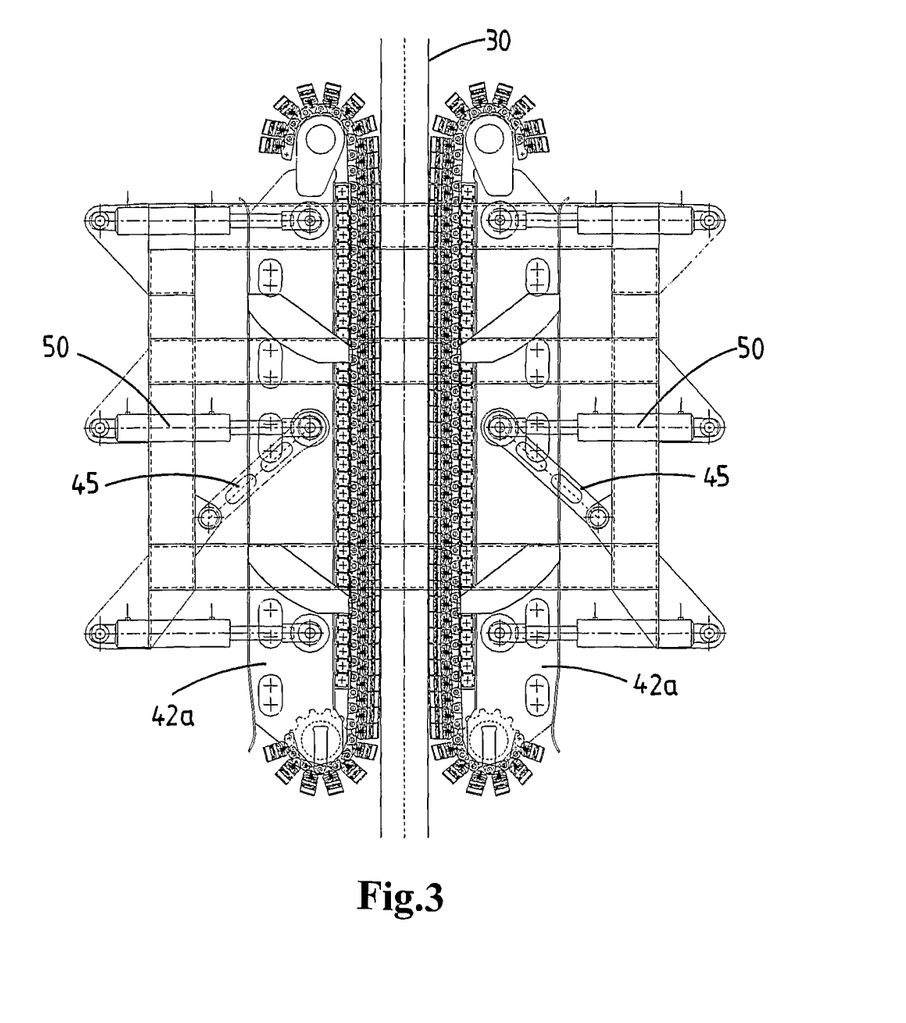
FIG. 3 shows in a view according to FIG. 2 the tensioner of FIG. 1 when handling a larger diameter pipeline.

In the FIGS. 1-6 a first preferred embodiment of the tensioner 40 according to the present invention is shown. The tensioner 40 is shown in vertical orientation but can also be used in other orientations, such as inclined and horizontal as is well known in the art, or in a tiltable structure. FIG. 2 shows a vessel 62 equipped with a marine tensioner according to the invention.

The tensioner 40 is mounted on a support structure 10 (here with two support members) of a pipelaying vessel (not shown here). As is known such a structure 10 may e.g. be a tower, e.g. an inclinable tower.

The tensioner 40 includes a tensioner frame 41 and multiple, here four, tracks units 42 supported by said tensioner frame 41 at position distributed around a pipeline passage having a pipeline axis 32 along which the pipeline 30 will pass through the tensioner. Usually this pipeline axis will coincide with an imaginary main axis of the tensioner, yet the track units may also be positioned to cause the pipeline axis 32 to differ from the main axis as will be clear from the description below.

Figure 4:
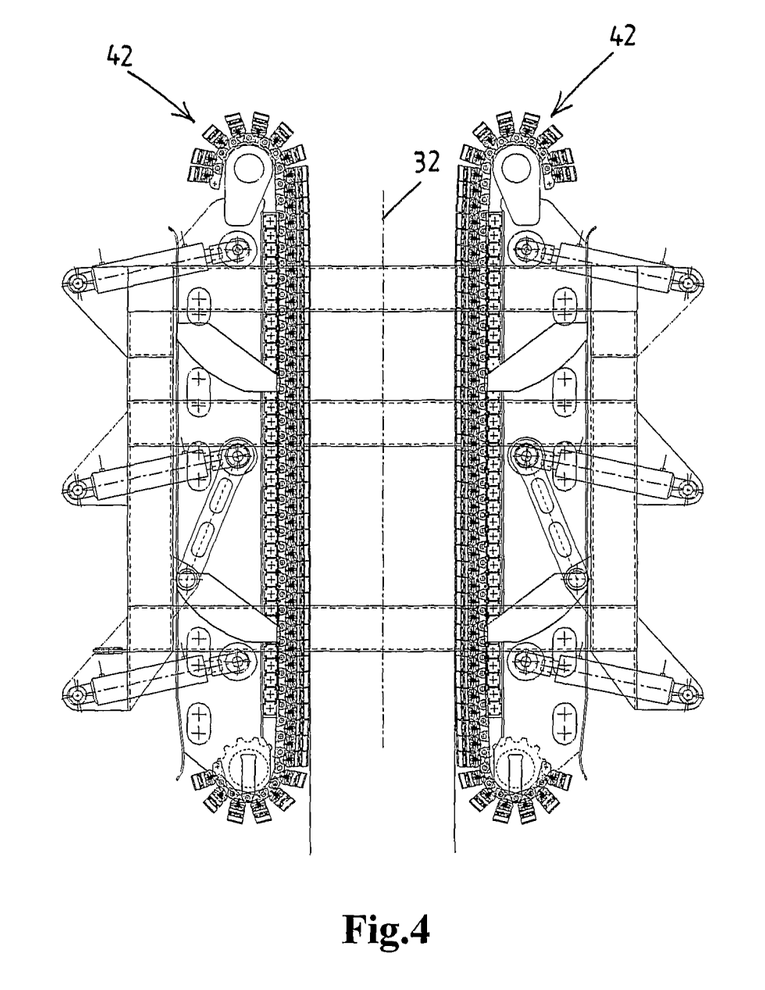
FIG. 4 shows in a view according to FIG. 2 the tensioner of FIG. 1 when opened to the maximum opening and the tracks are fully spaced apart.
Figure 5:
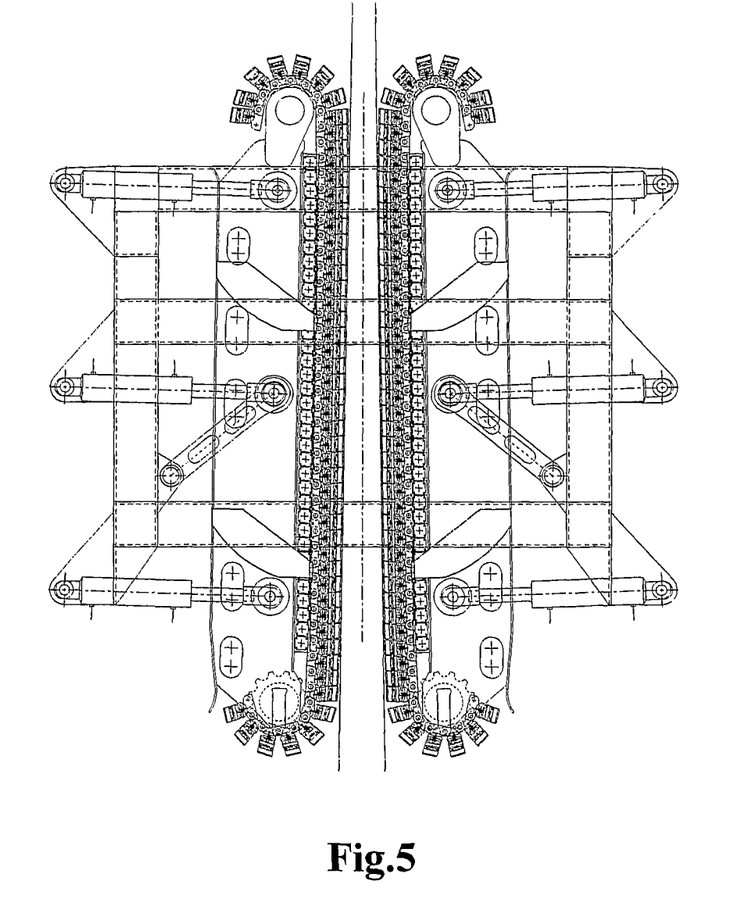
FIG. 5 shows in a view according to FIG. 2 the possibility of the track units to be oriented in a non-parallel manner so as to e.g. allow for the passage of a tapered pipeline section.
Figure 6:
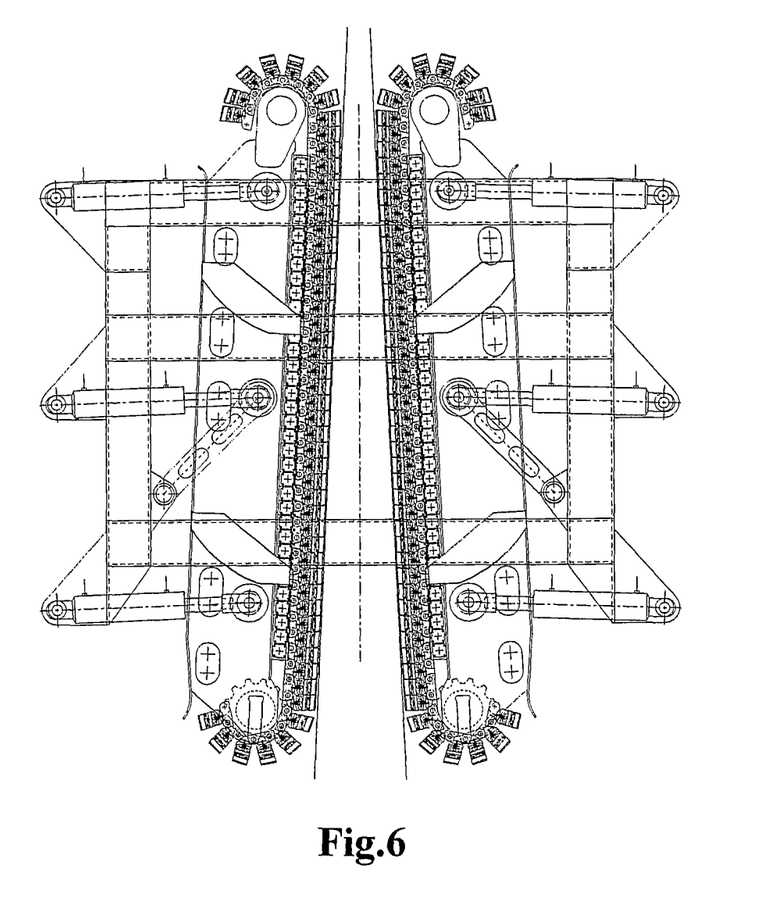
FIG. 6 shows in a view according to FIG. 2 an even more non-parallel orientation of the tracks of the tensioner of FIG. 1.
Figure 7:
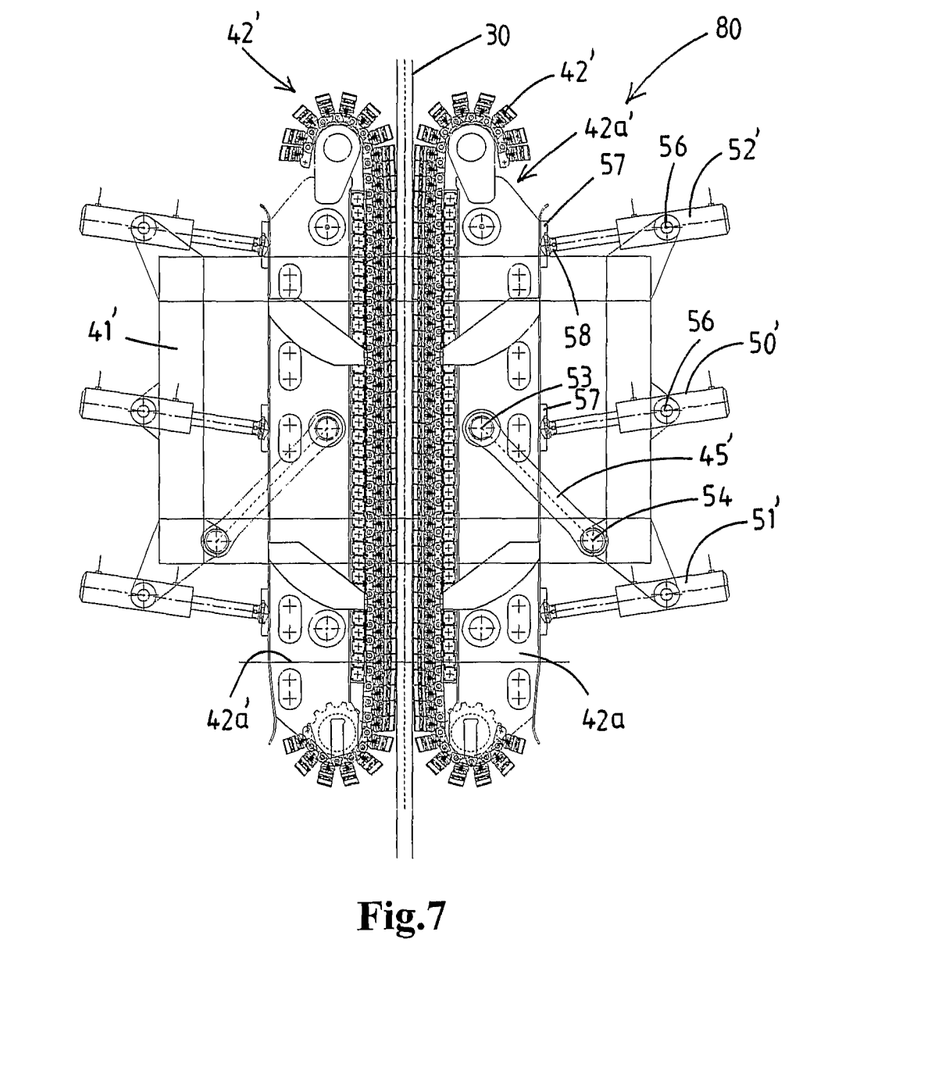
FIG. 7 shows in a view similar to FIG. 2 a further preferred embodiment of the tensioner according to the present invention when handling a rather small diameter pipeline.
Figure 8:
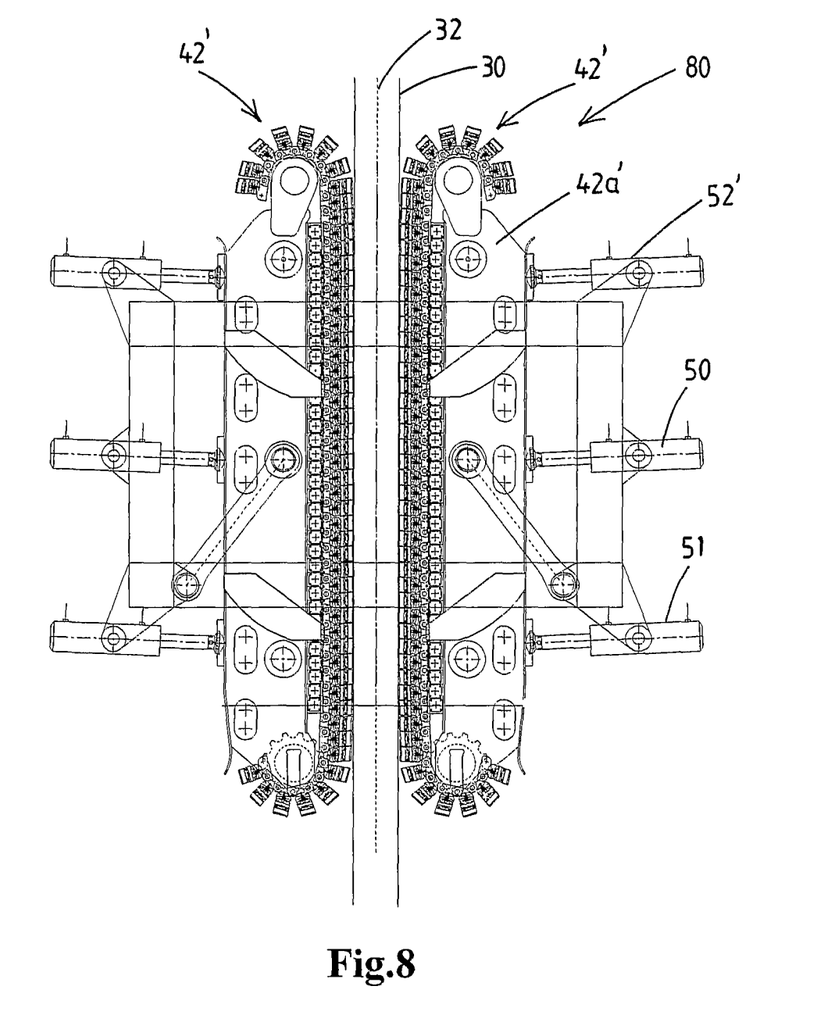
FIG. 8 shows the tensioner of FIG. 7 when handling a larger diameter pipeline.
Figure 9:
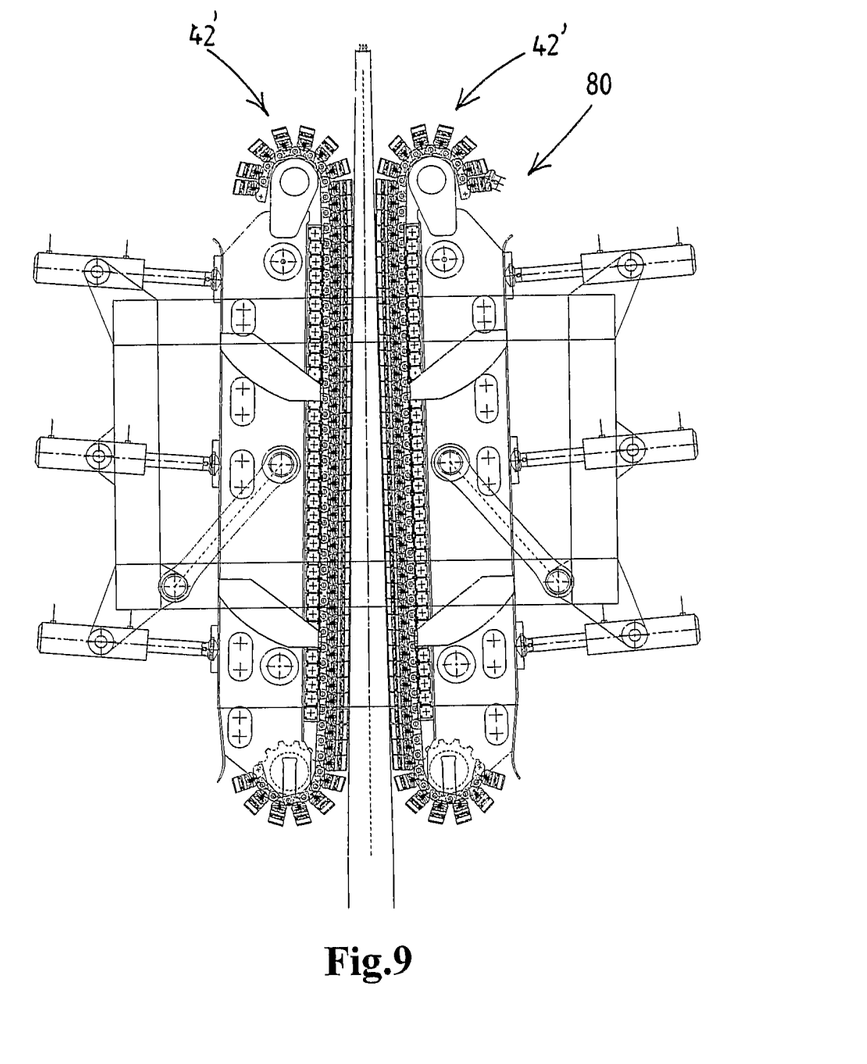
FIG. 9 shows the tensioner of FIG. 7 with the tracks arranged in a non-parallel manner.
Figure 10:
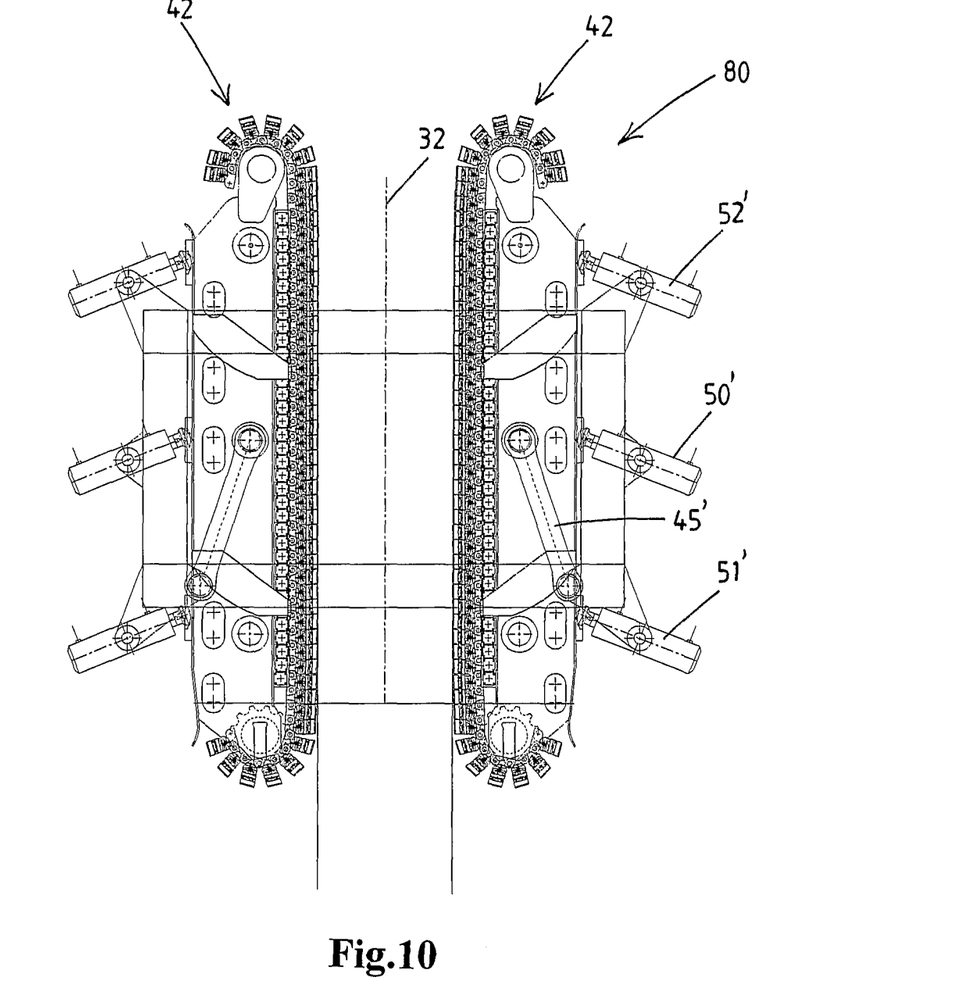
FIG. 10 shows the tensioner of FIG. 7 when opened to provided the maximum passage, e.g. for a pipeline equipped with an accessory.

The size of the exemplary tensioner 40 can be appreciated through FIG. 4 showing the maximum opening to be 3766 millimeters.

The frame 41 in the design shown here is of the annular frame type, here generally comprising multiple ring frame members spaced along the axis of the tensioner 40 and interconnected by further (generally axially extending) frame members.

The outer contour of the frame 41 here is about square, but other shapes, e.g. rectangular (e.g. for two tensioners) or triangular (when three tracks are used) are also possible.

In the design shown here, the tensioner frame 41 is designed so that the tensioner can be opened for lateral entry and/or removal of a pipeline into and/or from the tensioner.

In this design the frame 41 is modular and includes a base part 41c onto which a single track unit has been mounted, and three frame parts 41d,e,f also each supporting a single track unit, of which part 41f is pivotable to open the tensioner. The ends of the frame parts 41c,d,e,f are interconnectable/detachable via connecting members 48, e.g. pins which can be fitted through aligned openings in the free ends.

Each track unit includes at least one track 42b (in practice several parallel tracks 42b may be provided in one track unit), The tracks 42b are here basically an endless chain of interconnected friction pad carrying chain elements guided around chain supporting end rollers at each end of the chassis.

A track unit 42 includes an elongated and monolithic chassis 42a, preferably a welded steel chassis. The elongated chassis can be seen to have end portions at opposed ends thereof as well as a central portion between said end portions.

The chassis 42a is equipped with support rollers or other bearing means mounted thereon for the endless track 42b, and one or more track motion control members for effecting controlled motion of the associated track (that is normally a drive and/or braking and/or reverse motion of the track). In this example one or more hydraulic motors (not shown) are employed which control the motion of a track roller at an end of the tensioner, which track roller meshes with the track.

Between each track unit 42 and the tensioner frame 41a connecting structure is provided that allows for lateral motion of the track unit so as to adapt the position of the track unit to the pipeline diameter and also allows for a pivotal motion of each track unit so as to obtain a non-parallel orientation of the tracks of the track units with respect to the pipeline passage axis.

The figures also shown the presence of one or more squeeze actuators 50-52, here hydraulic cylinders, between the tensioner frame and the chassis of the track unit, which squeeze actuators 50-52 serve to provide (the major part of) the squeeze pressure.

These cylinders 50-52 are connected to an actuator control means that allows to control the squeeze force exerted by the friction pads of the track of track unit on the pipeline. In practice this will include a hydraulic system with one or more pumps and a valve arrangement and commonly electronics, e.g. including a computer, controlling the operation of the hydraulic system.

The actuator control means allow to independently control the force exerted by each of said squeeze actuators (or each pair) on the chassis.

As is preferred the actuator control means are adapted to compensate for vessel motion and/or sea state induced pipe load variation.

In this example at the point of engagement of each squeeze actuator on the chassis a load cell 60 is provided for measuring the actual force exerted at said location, a force signal of this load cell being transmitted to the actuator control means to control the squeeze force.

In a preferred embodiment at least one of the squeeze actuators (or one pair of squeeze actuators) is designed as double-acting hydraulic cylinder (in these examples all cylinders are) so as to be able to provide—during operation of the tensioner—a pull force on the chassis, effectively pulling the chassis outwards. This may not only be desirable in order to move the chassis outwards to open the passage for the elongated article, but also during operation of the tensioner when the elongated article is passed through the tensioner in a controlled manner, e.g. be desirable when handling a fragile pipeline or an umbilical, wherein the mere weight of the chassis, possibly in combination with the load exerted by the elongated article, creates an undesirably high squeeze force.

As can be seen the connecting structure of each track unit 42 here consist solely of a central linkage bar assembly 45 which is pivotally connected, at 53, to the central portion of the chassis 42a at a chassis end thereof and pivotally connected, at 54, to the frame 41 at a frame end thereof. The central linkage bar assembly includes two linkage bars mounted at opposite sides of the chassis (as can be seen in the top view of FIG. 1), which prevents rotation of the track unit about its longitudinal axis. In this manner the connecting structure of each track unit is solely connected to the central portion of the chassis and not to the end portions thereof.

The chassis 42a is pivotable about pivot axis 53 with respect to the swingable linkage bar assembly 45.

It can also be seen that the central linkage bar assembly 45 is arranged so as to be inclined with respect to the pipeline passage axis during operation of the tensioner, each of the linkage bars—from its frame end to its chassis end—generally extending counter to the direction of the pipeline load. This is done to cause the "self-clamping effect".

In this design it is envisaged that the central linkage bar assembly 45 provides a minor part of the squeeze force, e.g. about 10%. This allows for a reduction of the capacity of the actuator system, and e.g. allows to use small hydraulic actuators. An advantage of smaller hydraulic actuators is e.g. that they have less friction which is favourable e.g. when the control means are adapted to compensate for sea state induced load variations or the like.

In this preferred embodiment a pair of central squeeze actuators 50 is arranged so as to engage on the central portion of the chassis 42*a*, here as is preferred the actuators 50 engaging at the location of the pivot axis 53. Also two further pairs of squeeze actuators 51, 52 are provided, each engaging on a respective end portion of the chassis 42*a*.

As can be seen all the squeeze actuators 50-52 are arranged to engage directly on the chassis of the track unit.

The squeeze actuators 50-52 are arranged to be directed substantially in a plane normal to the pipeline axis during operation of the tensioner, so within the range of operational opening diameters of the tensioner, preferably within a range of at most 20 degrees with respect said plane.

Suitable operation of the actuator system allows to effect both lateral and pivotal motions of the track units and thus allow for variation of the diameter and shape of the gap or pipeline passage between the tracks 42*b* and to achieve a controlled exertion of pressure onto the pipeline to achieve the desired frictional force.

It is also preferred to provide position-sensing means 61 in the tensioner to be able to sense the position of at least one of the tracks units. It is envisaged that in a set of opposed track units, position sensing is used to hold one track at a stationary position, wherein an opposing track is operate to be mobile and to be controlled on the basis of pressure exerted on the pipeline.

FIGS. 7-10 show a tensioner 80 in a further preferred embodiment of the invention. As the skilled person will appreciate the general design of this tensioner 80 corresponds to the design of tensioner 40. The same or similar parts have been denoted with the same reference numeral provided with an accent.

A distinction with the tensioner 40 is that in tensioner 80 the squeeze actuators 50-52 act on the rear side of the elongated chassis 42, which rear side is opposite from the active side of the track.

In the tensioner 80 each actuator 50'-52' is mounted pivotally on the frame 41', the pivot axis 56 being located in a central region of the cylinder body instead of at the end of said cylinder body (see FIGS. 1-5). This is advantageous in view of buckling and in view of the dimensions of the tensioner frame.

In the tensioner 80 the piston rod end 58 of each actuator 50'-52' is spherical and is received in a cup member 57 fitted on the rear side of the chassis. This connection may be completed with a tensile load transmitting part, so that pulling inwards the piston rod results in outward motion of the chassis.

Figure 11:
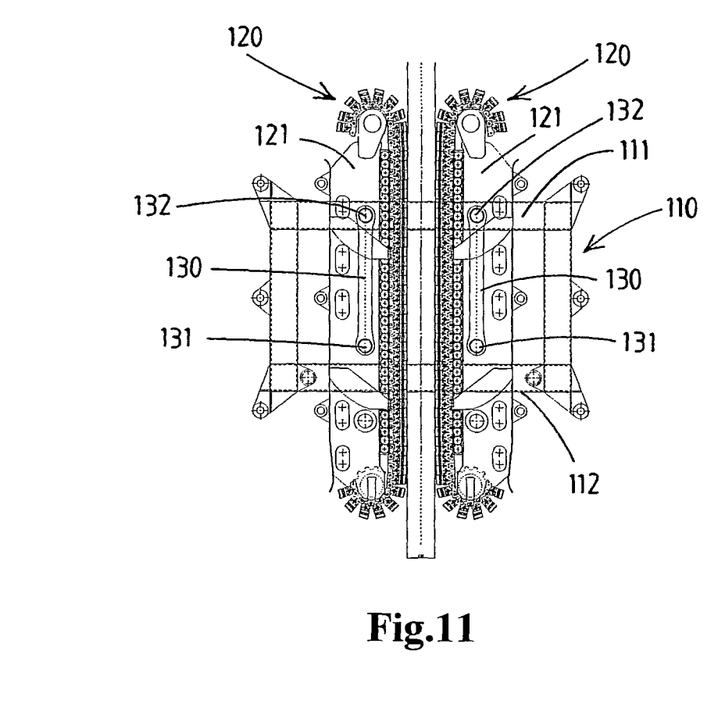
FIG. 11 shows in lateral side view two track units and the frame of an alternative tensioner according to the invention when handling a rather small diameter pipeline.
Figure 12:
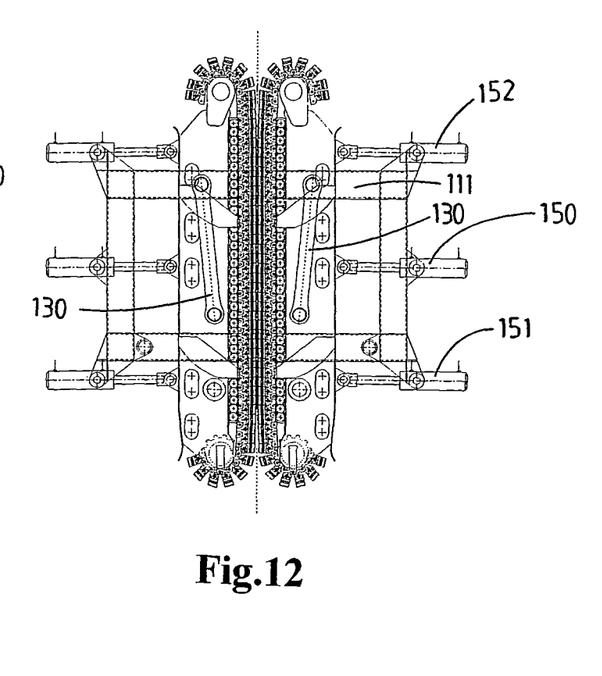
FIG. 12 shows in a view according to FIG. 11 the tensioner when fully closed in absence of a pipeline.
Figure 13:
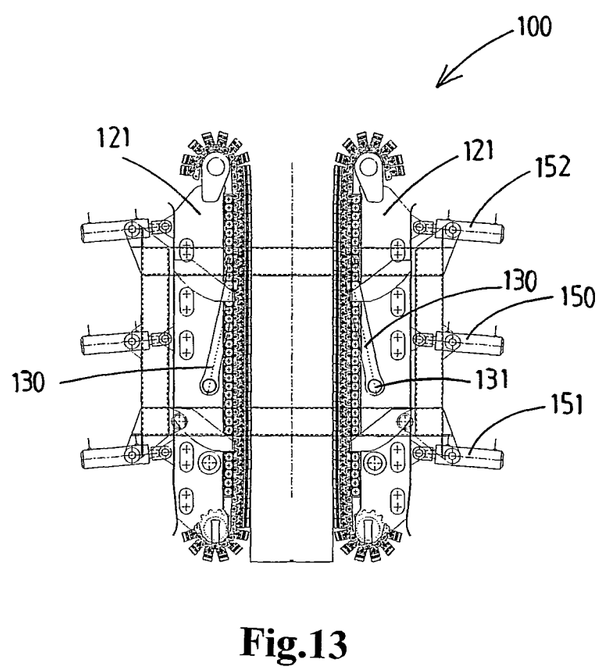
FIG. 13 shows in a view according to FIG. 11 the tensioner when opened to the maximum opening with the tracks full spaced apart.

Referring to FIGS. 11-13 now a third embodiment of a tensioner according to the invention will be discussed. The tensioner 100 has a frame 110 supporting multiple track units 120 of which two are shown in the FIGS. 11-13.

The frame 110 is, as is preferred, of the annular frame type, here generally comprising multiple ring frame members spaced along the axis of the tensioner 100 and interconnected by further (e.g. generally axially extending) frame members. In this embodiment two ring frame members 111, 112 are provided in the frame 110, indicated further as upper frame member 111 and lower frame member 112 respectively, as it is in this example intended to use the tensioner in non-horizontal orientations wherein the frame member 111 is above the frame member 112.

The connecting structure of each track unit 120 here consists solely of a central linkage bar assembly 130 which is pivotally connected, at 131, to the central portion of the chassis 121 at a chassis end thereof and pivotally connected, at 132, to the frame 110 at a frame end thereof.

The frame end 132 of each central linkage bar assembly 130 is connected to the frame 110 at such a location that the assembly 130 extends generally parallel to the article passage axis of the tensioner 100 and is primarily subjected to tensile load during operation of the tensioner. It will be appreciated that the linkage bar assemblies 130 can be effectively dimensioned to support large tensional forces, far better then compression and/or bending forces. So in general it is envisaged to arrange the central linkage bar assemblies in a tensile loading position between the central portion of the chassis of the track unit on the one hand and the frame on the other hand, the linkage assembly—from chassis end to frame end—thus generally being arranged opposite to the load of the pipeline on the tensioner.

As the tensioner 100 is intended for non-horizontal operation, one could described the linkage assembly 130 as a downward depending linkage assembly 130, the chassis being connected to the lower chassis end of the downwardly depending linkage assembly.

Here, as is preferred, the frame end of assembly 130 is located generally vertically above the chassis end of the assembly 130 when handling small diameter pipeline. As can be seen in FIG. 13 placing the track units in maximum opening position causes the assemblies 130 to be directed somewhat inclined outwards with their lower chassis ends, e.g. the angle with the article passage axis being less than 30 degrees.

Preferably the assemblies 130 are rather long. More preferably the effective length of each of the assemblies 130 is at least the same or greater as the distance between opposed track units in the maximum opening situation. It will be appreciated that a greater length of the assemblies 130 will result in the assemblies being in general more parallel to the article passage axis for all opening situations of the tensioner.

As is preferred the central linkage bar assembly 130 includes two linkage bars mounted at opposite sides of the chassis, which prevents rotation of the track unit about its longitudinal axis. In this manner the connecting structure of each track unit is solely connected to the central portion of the chassis and not to the end portions thereof.

In FIG. 11 the squeeze actuators 150-152 have been left out for reason of clarity, their positions and operation are clear from FIGS. 12 and 13.

It will be appreciated by the skilled person that preferred details, options, etc. discussed with reference to one embodiment can readily be used in combination with one or more of the other embodiments of the invention.

The invention claimed is:

1. A marine tensioner for handling an elongated article, said marine tensioner being adapted to absorb the load exerted by said elongated article on the marine tensioner, said marine tensioner comprising:

A tensioner frame,

Multiple track units mounted opposite to each other in said tensioner frame at positions distributed around an article passage having a passage axis, Wherein each track unit of the multiple track units comprises an elongated chassis, said elongated chassis having end portions at opposed ends thereof as well as a central portion between said end portions, Wherein each track unit of the multiple track units further comprises an endless track supported by said elongated chassis and one or more track drive/brake members for effecting drive or braking motion of the endless track, the endless track having a multitude of friction elements adapted to engage on the elongated article, to move and support the elongated article along the passage axis, Multiple connecting structures, wherein each connecting structure of the multiple connecting structures is provided between a track unit of the multiple track units and the tensioner frame and each connecting structure of the multiple connecting structures at least allows for lateral motion of the respective track unit relative to the passage axis so as to allow for variation of a diameter of the article passage and thus to adapt the position of the respective track unit to a diameter of the elongated article in the article passage, Wherein each connecting structure of the multiple connecting structures is solely connected to the central portion of the elongated chassis of the respective track unit and comprises a central linkage bar assembly which is pivotally connected to the central portion of the elongated chassis at one end and pivotally connected to the tensioner frame at another end, and each connecting structure of the multiple connecting structures is thus adapted to allow for a pivotal motion of the respective track unit so as to obtain a non-parallel orientation of the endless track of the respective track unit with respect to the passage axis and with respect to another track unit, for supporting a tapered section of the elongated article with all of the multiple track units, Wherein for each track unit of the multiple track units, one or more squeeze actuators are provided between the tensioner frame and the elongated chassis of the respective track unit, wherein the one or more squeeze actuators are each pivotally connected to the elongated chassis and are each also pivotally connected to the tensioner frame to laterally move and pivot the respective track unit and to exert a squeeze force by the friction elements of the endless track of the respective track unit on the elongated article in the article passage, and Wherein actuator control devices are provided which are associated with said one or more squeeze actuators of each track unit of the multiple track units and allow to control the squeeze force exerted by the friction elements of the endless track of each track unit of the multiple track units on the elongated article in the article passage.

2. The marine tensioner according to claim 1, wherein the central linkage bar assembly is arranged so as to be oriented generally parallel to an elongated article axis during operation of the marine tensioner.

3. The marine tensioner according to claim 1, wherein the one or more squeeze actuators are provided between the elongated chassis of the respective a track unit and the tensioner frame at spaced locations along the length of the elongated chassis of the respective track unit.

4. The marine tensioner according to claim 3, wherein a central squeeze actuator is arranged so as to engage on the central portion of the elongated chassis of the respective track unit and wherein at least two further squeeze actuators are provided, each engaging on a respective end portion of the elongated chassis of the respective track unit.

5. The marine tensioner according to claim 3, wherein the one or more squeeze actuators are arranged to engage directly on the elongated chassis of the respective track unit.

6. The marine tensioner according to claim 3, wherein the one or more squeeze actuators are arranged to be directed substantially in a plane normal to an elongated article axis during operation of the tensioner.

7. The marine tensioner according to claim 1, wherein said actuator control devices allow independently control a force exerted by each of said one or more squeeze actuators on the elongated chassis of the respective track unit.

8. The marine tensioner according to claim 1, wherein said actuator control devices are adapted to compensate for vessel motion or sea state induced pipe load variation.

9. The marine tensioner according to claim 1, wherein at a point of engagement of each of said one or more squeeze actuators on the longitudinal chassis of the respective track unit a load cell is provided for measuring an actual force exerted at the point of engagement, a force signal of this load cell being transmitted to the actuator control devices to control the squeeze force exerted at said point of engagement.

10. The marine tensioner according to claim 1, wherein the one or more squeeze actuators are hydraulic cylinders and wherein said actuator control devices are hydraulic control devices that allow to control a pressure within each hydraulic cylinder independently.

11. The marine tensioner according to claim 1, wherein position-sensing devices are provided to sense the position of at least one track unit of the multiple tracks units within the tensioner frame.

12. A marine pipeline installation vessel including a marine tensioner according to claim 1.

13. A method of installing a marine pipeline wherein use is made of a marine tensioner according to claim 1.

14. The marine tensioner according to claim 2, wherein multiple squeeze actuators are provided between the elongated chassis of the respective track unit and the tensioner frame at spaced locations along the length of the elongated chassis of the respective track unit.

15. The marine tensioner according to claim 4, wherein the one or more squeeze actuators are arranged to engage directly on the elongated chassis of the respective track unit.

16. The marine tensioner according to claim 4, wherein the one or more squeeze actuators are arranged to be directed substantially in a plane normal to an elongated article axis during operation of the marine tensioner.

17. A marine tensioner for handling an elongated article, said marine tensioner being adapted to absorb the load exerted by said elongated article on the marine tensioner, said marine tensioner comprising:

A tensioner frame;

Multiple track units mounted in said tensioner frame at positions distributed around an article passage having a passage axis, Wherein each track unit of the multiple track units comprises an elongated chassis, said chassis having end portions at opposed ends thereof as well as a central portion between said end portions, Wherein each track unit of the multiple track units further comprises an endless track supported by said elongated chassis and track motion control devices for effecting controlled motion of the endless track, the endless track having a multitude of friction elements adapted to engage on the elongated article, Multiple connecting structures, wherein each connecting structure of the multiple connecting structures is provided between a track unit of the multiple track units and the tensioner frame, and each connecting structure of the multiple connecting structures allows for lateral motion of the respective track unit so as to adapt the position of the respective track unit to a diameter of an elongated article in the article passage, Wherein each connecting structure of the multiple connecting structures is solely connected to the central portion of the elongated chassis of the respective track unit and consists of a central linkage bar assembly which is pivotally connected to the central portion of the elongated chassis at one end and pivotally connected to the tensioner frame at another end, and each connecting structure of the multiple connecting structures is thus adapted to allow for a pivotal motion the respective track unit so as to obtain a non-parallel orientation of the endless tracks of the respective track unit with respect to the passage axis, Wherein for each track unit of the multiple track units multiple hydraulic cylinders are provided between the elongated chassis of the respective track unit and the tensioner frame at spaced locations along the length of the elongated chassis, wherein each hydraulic cylinder of the multiple hydraulic cylinders is pivotally connected to the elongated chassis and is also pivotally connected to the tensioner frame to laterally move and pivot the respective track unit, and Wherein hydraulic control devices are provided which are associated with said multiple hydraulic cylinders and allow to independently control a force exerted by each hydraulic cylinder of the multiple hydraulic cylinders, and thus control a squeeze force exerted by the friction elements of the endless track of each track unit of the multiple track units on the elongated article, and furthermore enable pivoting of each track unit of the multiple track units in a tapering position, in a non-parallel orientation with respect to the passage axis and with respect to another track unit, to support a tapered section of the elongated article with each track unit of the multiple track units.

* * * * *